United States Patent [19]

Carimentrand

[11] Patent Number: 5,060,578
[45] Date of Patent: Oct. 29, 1991

[54] MEMBRANE SYSTEM FOR CONNECTING CONSECUTIVE VEHICLES

[75] Inventor: Jean-Paul Carimentrand, Decize, France

[73] Assignee: Caoutchouc Manufacture et Plastiques S.A., Versailles Cedex, France

[21] Appl. No.: 500,406

[22] Filed: Mar. 28, 1990

[30] Foreign Application Priority Data

Mar. 28, 1989 [FR] France ................. 89 04125

[51] Int. Cl.$^5$ .............................................. B60D 5/00
[52] U.S. Cl. ......................................... 105/18; 105/20
[58] Field of Search ........................ 105/15, 18, 19, 20, 105/16; 280/403

[56] References Cited

U.S. PATENT DOCUMENTS

| 2,991,509 | 7/1961 | Brophy | 18/56 |
| 4,690,421 | 9/1987 | Schmidt et al. | 105/18 |

FOREIGN PATENT DOCUMENTS

| 0067944 | 12/1982 | European Pat. Off. | |
| 00114913 | 8/1984 | European Pat. Off. | |
| 0363974 | 4/1990 | European Pat. Off. | 105/18 |
| 0137043 | 4/1934 | Fed. Rep. of Germany | 105/15 |
| 695534 | 12/1930 | France | |
| 2328141 | 5/1977 | France | |
| 2333657 | 7/1977 | France | |
| 2348829 | 3/1982 | France | |
| 02496030 | 6/1983 | France | |
| 2529836 | 2/1984 | France | |
| 2568195 | 5/1986 | France | |
| 2573714 | 5/1986 | France | |
| 0336809 | 10/1989 | France | |
| 471036 | 8/1937 | United Kingdom | |
| 2122956 | 1/1984 | United Kingdom | |

Primary Examiner—Matthew C. Graham
Assistant Examiner—Mark T. Le
Attorney, Agent, or Firm—Nils H. Ljungman & Associates

[57] ABSTRACT

Elastically deformable self-supporting membrane making possible intercommunication between consecutive railway vehicles formed by corrugations of increasing depths and essentially constant thickness. The thickness of each end corrugation is increased and the outer peaks of the corrugations are reinforced by an extra thickness having a higher modulus than the rest of the coating.

18 Claims, 3 Drawing Sheets

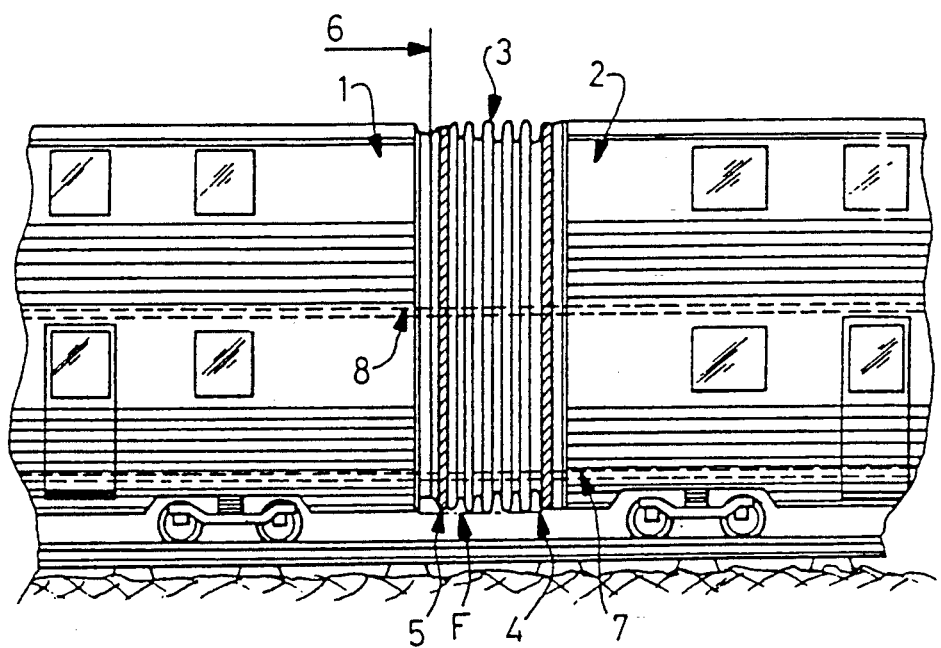
FIG_1
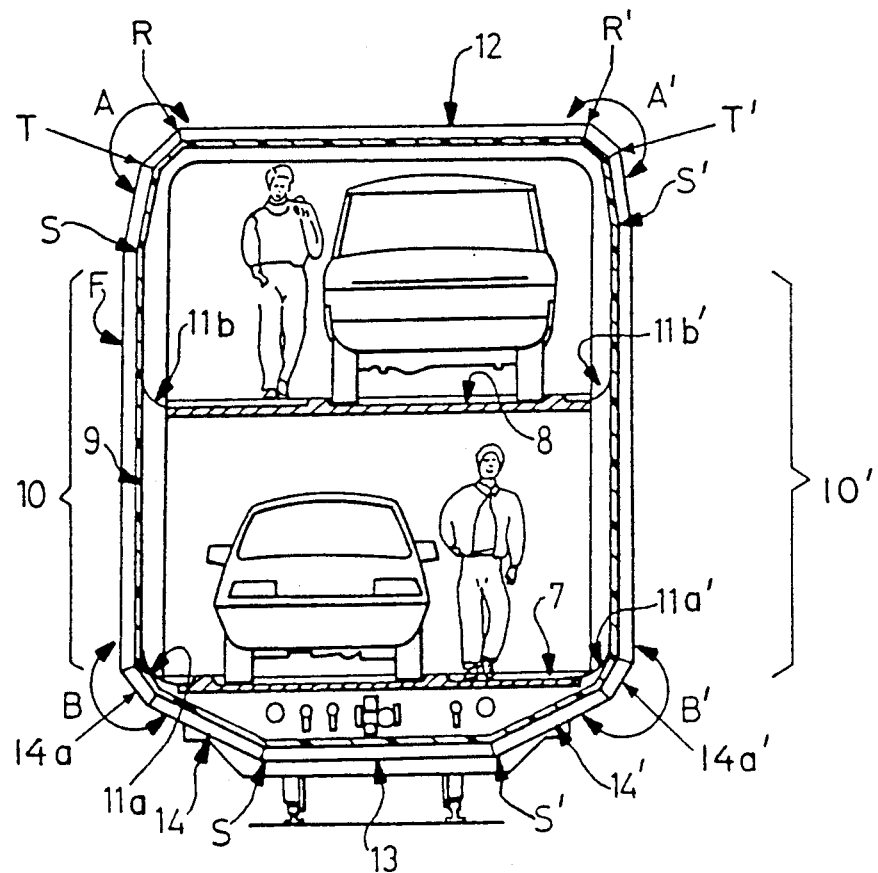
FIG_2

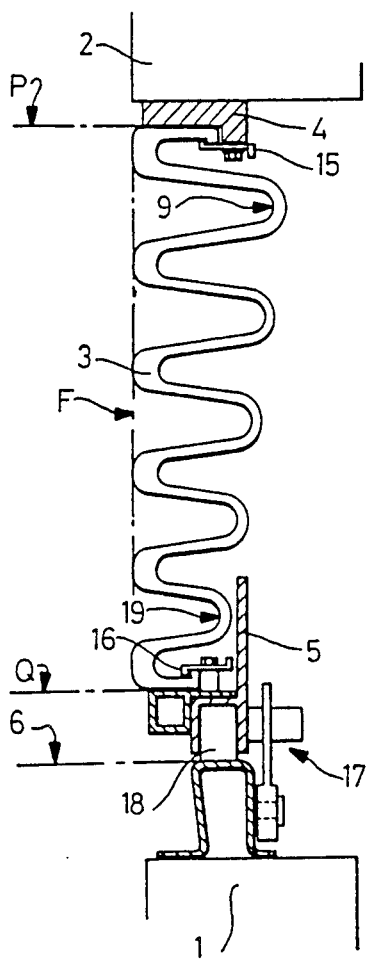
FIG_3
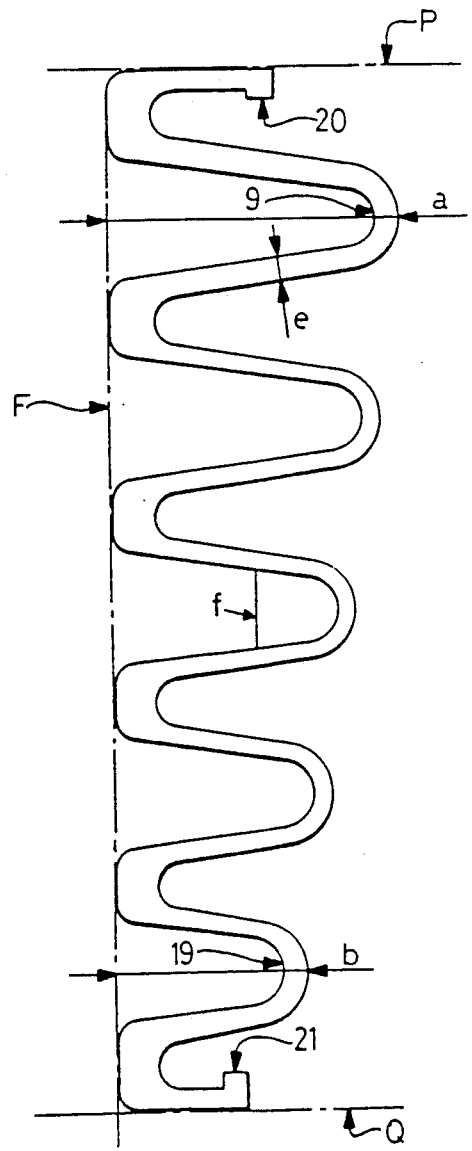
FIG_4

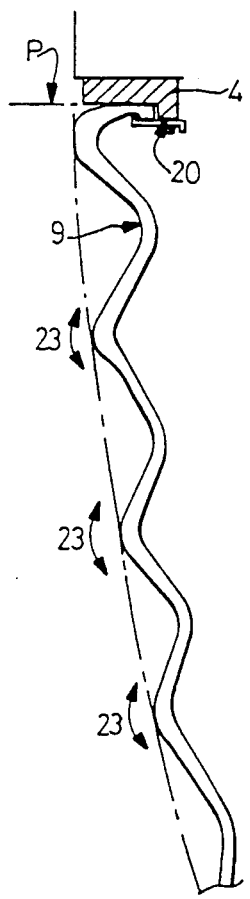
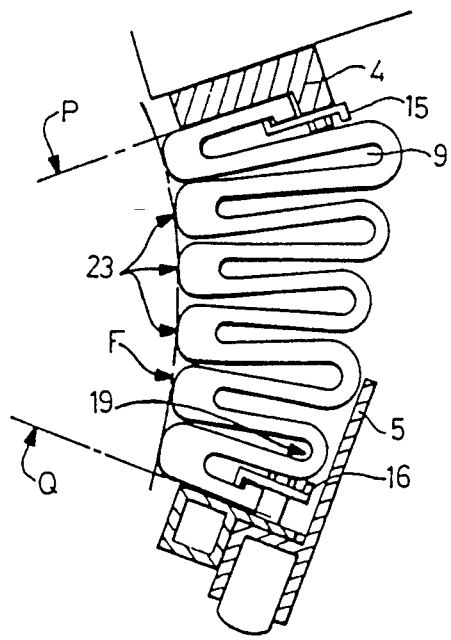
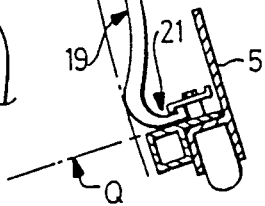
FIG_5a
FIG_5b
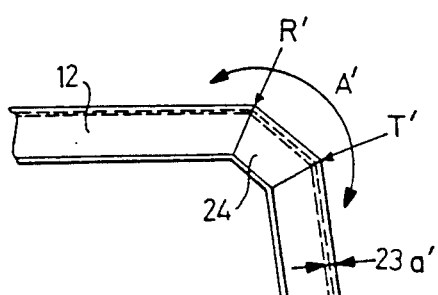
FIG_6a
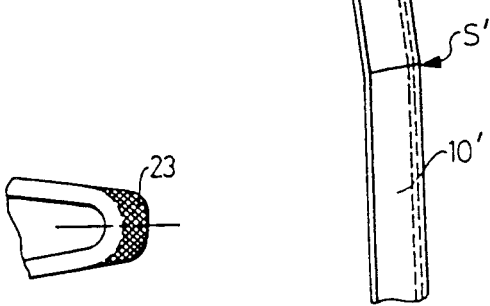
FIG_6b

MEMBRANE SYSTEM FOR CONNECTING CONSECUTIVE VEHICLES

BACKGROUND OF THE INVENTION

1. Field of the Invention

This invention relates to a membrane system, which makes possible intercommunication via an enclosed passage way between successive, consecutive railway or road vehicles used to transport passengers and/or accompanied vehicles. The present invention employs an elastically deformable, self-supporting membrane in the form of concertina bellows to completely surround and enclose the exposed passage way preferably with a weathertight seal which also is substantially soundproof and fireproof.

2. Background Information

The term "concertina vestibule" characterizes the first generation of essentially weathertight means obtained by using multiple accordion like folds with flat walls made of a flexible material to connect the successive railway vehicles used for passenger transportation. Originally made of leather, these concertina vestibules are being constructed of waterproof rubber fabric as disclosed, for example, in French Patent No. 695.534 (SEBILLE). Such constructions need several round-off parts and superimposed layers of elastomer compounds.

A current method or technique of using concertina bellows, in particular on articulated auto-buses and tramways on rails, is to cut and crimp the waterproof fabrics of the membranes comprising the bellows. Sometimes, the waterproof fabrics may consist of superimposed materials layered in a complex structure so as to improve the insulation ability of the structure. These waterproof fabrics can alternatively be crimped on their exterior and interior periphery.

Various improvements to this technology are disclosed in patents European Patent No. 114,913 and French Patent No. 2,348,829, and French Utility Certificate No. 2,333,657 (HUBNER).

French Patent No. 2,328,141 (TAURUS) discloses improvements in the shape of pleats or accordion-like folds which comprise the form of the concertina bellows to make the bellows more self-supporting.

This type of concertina bellows are commonly manufactured in the form of flat parts then corrugated or shaped in pleated form, that is, an 'accordion-like' shape. The concertina bellows must be further extended from a rest position, to the service position. The desired or required extended position would then be held by a tensile force exerted on the flanges when each end of the bellows is originally fastened to connect two consecutive vehicles, for example, railway or auto-buses.

Since the fabric or materials comprising the bellows have a relatively thin structure in the prior art, very little thermal and acoustical insulation was obtained.

French Patent No. 2,529,836 (TAURUS) represents a border between two possible types of vestibule membranes, in that the membrane represents a concertina bellows having thin walls, but the membrane is made by a molding process using polyurethane foam. The major disadvantage of such a design for a membrane resides essentially in the brittleness of the curved portions of the pre-formed corrugated membrane, which curved portions are thinner and lack reinforcement. The curved portions of the corrugations are usually the most vulnerable areas since these areas are almost completely exposed when fully extended such as, to be acted upon by any unfavorable climatic conditions, for example, rain, snow or intense sunlight.

The method for the construction of such a concertina vestibule is related to the more recently designed membranes used in railway applications in particular. The deformable membranes are usually manufactured on a molding mandrel and result in a sort of closed ring, tunnel-like structure around the passage way between railway vehicles. Such membranes, which do provide a covered passage way between the railway cars and have some thermal and acoustical insulation properties, are referenced, but without a description of the membrane itself, in French Patent No. 2,496,030, French Patent No. 2,573,714 (FAIVELEY), and French Patent No. 2,568,195 (SIG). Additionally, each of these three patents does describe a device which allows for the movement of passengers between vehicles. The design of such membranes is intended to avoid the placement of facing end doors, the acoustical insulation being supplied by sheathing the membrane by sliding partitions and not being supplied by the membrane itself. The three patents describe in detail the floors and rigid assembly means, but not the membrane itself.

The prior art appears to recognize many of the requirements for such membranes. However, the prior art does not include any technique which is capable of correctly satisfying the contradictory requirements of having a flexible but self-supporting membrane, which also provides thermal and acoustical insulation, protection against the wind caused by the speed of travel and at the same time is economical to produce and of light weight.

FAIVELEY and CAOUTCHOUC MANUFACTURE ET PLASTIQUES have jointly filed Patent Application EP 0336809, which discloses an elastically deformable membrane capable of meeting the new requirements expressed by the railway industry. This membrane is also a one-piece construction which has a corrugated surface formed by parallel rings and has a sinusoidal cross section while in the relaxed state. The one-piece membrane connects with two fastening flanges to the ends of successive railway cars and is partly compressed when installed. The thickness of the wall of the membrane is essentially constant in the straight portions as well as in the curved, non-developable portions.

However, further experimentation, with membranes of a constant thickness and constructed according to the above design to cover very large passage ways, has shown that these membranes are too flexible. These membranes, with textile reinforcements in the straight portions and unreinforced elastomer layers, have good mechanical qualities in the core, and also have soundproof and fireproof qualities in the coatings. But these membranes are so extremely flexible that their horizontal portions have an exaggerated curve and lack the self-supporting capabilities necessary to cover the very large and very high intercommunication passage ways, such as on the two story trains used to transport cars and trucks, and commonly called auto-trains.

OBJECT OF THE INVENTION

The desire for improved systems having a flexible, deformable, self-supporting membrane to cover and enclose connecting passage ways between successive railway or road vehicles has led to a redefinition of the shape of and construction of a deformable membrane.

The object of the invention is to provide a continuous connecting system using an elastically deformable, and self-supporting membrane between successive railway or road vehicles of large dimensions, for example, 4 meters wide and 5 meters high, without reducing or narrowing the size of the passage way. It is a further object of the invention to provide a system for protection from bad weather, excessive wind and to insulate against extreme outside temperature and outside noises, which system is at the same time as economical to construct and of light weight.

The present invention is characterized by having a corrugated surface which has folds or pleats of increasing depth between the assembly flange and the fastening flange.

A cross section of the straight elements shows a sinusoidal curve with varying amplitudes. The wall thickness is essentially the same throughout the intermediate corrugations which include a series of substantially straight segments connected together to form the seemingly curved portions of the corrugations. The wall thickness preferably increases slightly at the bottom, exterior peak of each corrugation due to the reinforcement with layers of elastomer compound at these peaks.

The first corrugation, preferably being the shallowest or shortest, and the last corrugation, preferably being the deepest or longest, are designed to have an increase in the wall thickness so as to preferably increase the self-supporting character of the membrane.

The assembly process preferably employs a slight tensile force to preferably further improve the self-supporting character of the membrane. The connection of the vertical, horizontal and diagonal straight elements, which may or may not be reinforced with textile fibers or cords, is preferably accomplished with connecting mitres forming a polygonal shape which preferably eliminate or minimize the risk of the membrane kinking if placed under extreme deformation conditions.

SUMMARY OF THE INVENTION

This membrane is therefore self-supporting, one-piece, elastically deformable structure which is designed preferably to provide weatherproof protection for an intercommunication passage way between successive railway or road vehicles, while keeping the overall size of the passage way almost the same as the overall size of the opening between connecting vehicles.

The materials which comprise the self-supporting membrane may include an elastomer compound reinforced with textile fibers or cords.

The membrane is preferably formed by successive corrugations which constitute the straight segments, having a continuous corrugated cross section over the entire periphery of the passage to be protected. The self-supporting, elastically deformable membrane, which is part of the invention herein, is characterized by the fact that the depth or height of the corrugations increases from one end of the membrane to the other end, with each end being preferably equipped either with an assembly flange or a fastening flange.

The membrane is further characterized by the fact that the thickness of the corrugations, which is essentially constant along the intermediate or in-between corrugations, increases along the shallowest corrugation at one end and increases along the deepest corrugation at the other end.

Yet further, the peak of each corrugation which is flush with the lateral exterior surface of the railway vehicles, has a thickness which is greater than the essentially constant thickness of the intermediate or in-between corrugations since a profile made of an elastomer compound was added to, that is layered upon, each outer peak.

Still further, the substantially straight segments or corrugated walls of the self-supporting membrane are interconnected with mitres in one manner at the top corners and possibly at the lower corners by mitre connections separated by a short straight segment.

BRIEF DESCRIPTION OF THE DRAWINGS

The characteristics and advantages of the present invention are described in greater detail below with reference to the accompanying drawings.

FIG. 1 is a general side elevational view of the preferred system for connecting railway vehicles showing the location of the deformable membrane when then membrane is fastened between two consecutive vehicles;

FIG. 2 is a cross sectional view of a two-story railway vehicle used to transport passengers and road vehicles illustrating the attachment surface on the outside periphery of a railway vehicle to which one end portion of the preferred self-supporting membrane can be attached.

FIG. 3 is a horizontal cross sectional view of the preferred membrane in FIG. 1, illustrating a manner of fastening the membrane to each end between consecutive vehicles.

FIG. 4 is an enlarged horizontal cross sectional view of the membrane as shown in FIG. 3, illustrating the differences in the thickness of the wall areas throughout the corrugated membrane.

FIG. 5a shows the deformation of the preferred membrane shown in FIG. 3 when the membrane is fully extended.

FIG. 5b shows the deformation of the preferred membrane shown in FIG. 3 when the membrane is fully compressed.

FIG. 6a is an enlargement of a fragmentary sectional view of a portion of the periphery of the membrane shown in FIG. 2.

FIG. 6b is a further enlargement of a cross-section of the membrane shown in FIG. 6a.

DESCRIPTION OF THE PREFERRED EMBODIMENTS

FIG. 1 is a general side view of a train having two-story shuttle cars which are connected by an elastically deformable, self-supporting membrane and which cars are generally used to transport passengers and passenger accompanied vehicles. This type of train is used, for example, to transport passengers and vehicles through the Tunnel located under the English Channel. According to the present invention, a similar or like arrangement for a connecting membrane may be used, for example, in single story tramways (trolley cars) and articulated buses as a part of a metropolitan mass transit systems.

In FIG. 1, between the two consecutive vehicles 1 and 2, a deformable, self-supporting membrane 3 provides a continuous seal by closely following the entire periphery of the outside surfaces of each railway vehicle. One end of the membrane 3 is permanently attached to one end of a railway car 2 by means of a fastening flange 4 which is located on railway car 2. An assembly flange 5 is attached permanently, that is fastened with bolts, to the other, opposite end of membrane 3.

The bolted assembly flange 5 can be locked and unlocked with a relatively easy maneuver on an assembly surface 6 which is part of vehicle 1. Thus, assembly flange 5 is typically not only permanently attached to membrane 3, but it is supported, with hardly any deflection, by the structural rigidity of the membrane 3.

The self-supporting membrane 3 should be positioned and attached so that its exterior surface (F) is flush with, as much as possible, the corresponding exterior wall surfaces of both railway vehicles 1 and 2. The positioning of the membrane 3 would preferably occur when both vehicles are in a substantially level position, and one railway vehicle is directly behind the other. When the vehicles are uncoupled, the assembly flange 5 is easily released from the assembly surface 6 on railway car 1 with the membrane 3 remaining attached to railway vehicle 2.

As embodied in FIG. 2, the vehicles and the passengers, transported on lower level 7 and on upper level 8 of the two-story railway vehicle, are preferably totally protected against dust and bad weather, as well as preferably against the noise and wind currents from passing trains, by the inherent rigidity of the self-supporting membrane 3 which surrounds the passage way.

FIG. 2 is a cross sectional view between railway vehicles 1 and 2 which have two levels 7, 8 and are used to transport passengers and road vehicles and further illustrates the outside attachment surface of the membrane on the railway vehicles. This cross section only cuts the membrane 3 along a traverse plane located in the deepest corrugation 9. The end portion having the deepest corrugation 9 of the deformable, self-supporting membrane, is the end which is preferably permanently attached to railway car 2.

FIG. 2 further shows that the exterior surface (F) of the deformable membrane preferably follows as closely as possible the periphery of the outside surface of the railway vehicle 2 to preferably form a tight seal. A portion of the peripherial surface is preferably underneath lower level 7, and is also preferably underneath the railway parts and controls such as the couplings, bumping posts and pneumatic or electrical connections. These railway parts and controls are schematically shown in FIG. 2 and are typically located beneath the floor of lower level 7, inside the seal of the membrane. Since the membrane seal is below these railway parts and controls, the very end of the bottom peaks formed by the corrugated membrane extends preferably even further below the seal. Thus, these railway parts advantageously are thereby preferably completely enclosed and protected from the weather by the membrane.

The space surrounding these railway parts and controls can be advantageously further sealed from the rest of the railway compartment carrying the passengers and accompanied vehicles by preferably attaching the self-supporting membrane 3 to each side of the floor of level 7 and the floor of level 8 with appropriate sealing elements 11a, 11a', 11b, and 11b'.

Sealing elements 11a, 11a' extend from the floor of level 7 to the membrane 3 at the points wherein the membrane 3 forms substantially vertical wall segments 10, 10' respectively. Similarly, sealing elements 11b, 11b' extend from the floor of level 8 to the vertical wall segments 10, 10' preferably providing a quasi-sealed separation as a safety feature between the lower level, compartment 7 and upper level, compartment 8.

The end surface of the membrane comprises long and short straight segments to follow closely the contour of the periphery of the outside surface of the railway vehicle. The straight segments are connected to each other in one manner by means of miters and are attached in another manner (not shown) to the periphery of the railway car by means of flanges. In FIG. 2, the horizontal roof portion of the railway car corresponds to a horizontal straight roof segment 12 of the membrane 3. At each top corner A, A', two proportionally short, straight segments are connected to the horizontal roof segment 12 and to the railway car at miters R, R' respectively. These segments are positioned to form an angle of approximately 35 to 40 degrees with respect to the horizontal roof segment 12.

These two segments continue to connect with two short, almost vertical segments and connect with the railway car at miters T, T' respectively. The two almost vertical segments continue to connect with the long vertical segments 10, 10' as well as connect with the railway cars at miters S, S'. Long vertical segments 10, 10' basically form the vertical wall structures of the membrane 3 and correspond closely in height to the side walls of the railway car.

Similarly, at each bottom corner B, B', there are two relatively short, straight segments 14, 14' on each lower side of the railway car angled at approximately 35 to 40 degrees with respect to the horizontal floor of level 7 to form the "curved corners" and to thus advantageously extend to the floor 14 of the membrane 3 below the floor 7 of the railway car.

These segments 14, 14', along with two other very short segments 14a, 14a' correspond to the corners B, B' and connect the horizontal floor 13 of the membrane 3 to each of the vertical wall segments 10, 10' as well as connect to each other with miter connections. Thus, the somewhat circular periphery of the railway vehicle is sealed by the polygonal shaped end surface of the membrane composed of a series of straight segments forming the roof, walls, floor and corners of the membrane to correspond to the roof, walls, floor and corners on the periphery of the outside surface of the railway car.

FIG. 3 is a cross sectional view of any straight segment section of the self-supporting membrane 3. This figure further shows the method of fastening the membrane to the railway vehicles as well as the associated geometrical configurations formed.

The self-supporting membrane 3 is fastened at the surface (P) of the railway vehicle 2 by means of an anchor plate 15 which is bolted to a fastening flange 4; fastening flange 4 being permanently attached to railway car 2. In a similar manner, by means of bolts and anchor plate 16, the opposite end of membrane 3 is fastened at the surface (Q) of railway vehicle 1 by means of the assembly flange 5, which is attached to membrane 3.

Since all of the segments of the self-supporting membrane 3 are substantially straight and of a specified length, the anchor plates 15, 16 can be made from metal profiles cut to the corresponding length required. The anchor plates 15, 16 provide a tight assembly on the fastening flange 4 and the assembly flange 5, since these flanges are made from stainless steel or treated aluminum metal profiles. The assembly flange 5 when attached to membrane 3 is easily attached to surface 6 of railway car 1 by locking means 17 and gaskets 18. The locking means 17 and gaskets 18, although shown in FIG. 3, are outside the scope of the invention. Also outside the scope of the invention is the centering means (not shown) which makes possible the correct positioning of the gasket 18 on the assembly surface 6 prior to fastening the assembly flange 5 to railway car 1.

The assembly flange 5 is supported exclusively by the inherent rigidity of the self-supporting membrane 3 when the railway vehicles are uncoupled. The structure of the self-supporting membrane 3 is designed to support the weight of the assembly flange 5, without deflection, when at rest, when slightly retracted from the locked position and also when the vehicles are moved closer together and connected by their couplings. The operation of the locking means 17 is designed to exert a slight tensile force on the self-supporting membrane 3. This tensile force firmly presses the gasket 18 against the assembly surface 6 on the vehicle 1, thereby providing a good seal from undesirable noises including high pressures winds produced when railway vehicles pass at high speeds travelling in opposite directions.

According to the embodiment in FIG. 3, the depth of the corrugations of the membrane gradually increases from one end to the other. The shallowest or shortest corrugation depth 19 is attached to assembly flange 5 and the depth increases along the membrane, becoming the deepest or longest depth 9 at the opposite end, adjacent to fastening flange 4. A reduced height is needed for corrugation 19 and at least one of the successive corrugations since space is required for the locking means 17 and centering means to operate properly. To allow for a significant moment of inertia in flexure for the assembly flange 5, the first corrugation 19 and successive corrugations are preferably kept from contact with assembly flange 5. In the preferred design, the corrugations increase in depth to the opposite end of membrane 3 to the deepest corrugation 9, which is attached to fastening flange 4. As schematically shown in FIG. 3, fastening flange 4 has different configuration than assembly flange 5 and is permanently fastened at the surface (P) to railway car 2.

According to the invention, in another embodiment, which uses a different assembly process (not shown), the increase in the depth of the corrugations may occur in the reverse direction, from the fastening flange to the assembly flange, depending on requirements and the need for space.

In either embodiment, the self-supporting membrane is designed so that the exterior surface (F) of all the corrugations are flush with the exterior surfaces of the railway vehicles 1 and 2. Thus, the membrane is designed so that the various mechanical assembly components, such as the centering and locking means (17) sealing anchor plates 15 and 16, are protected from adverse atmospheric and weather conditions.

FIG. 4 shows an enlarged cross sectional view of the self-supporting membrane in FIG. 3 when the membrane is in a rest position. The deepest corrugation 9, adjacent to a fastening bead 20 on the surface (P), has an overall height (a). The shallowest corrugation 19, adjacent to a assembly bead 21 on the surface (Q), has an overall height (b) which is approximately equal to 0.65 times the value of said overall height (a). The wall of the self-supporting membrane 3 is comprised of elastomer compounds which have preferably been made from a formulation designed to improve their resistance to fire, and which are reinforced with textile fibers or cords embedded in the elastomer compound.

The basic elastomer compound is thereby selected from among those which have halogen atoms such as chlorine or bromine in their molecule. By way of non-restricting examples, the basic elastomer compound can thus be preferably polychloroprene, chlorinated polyethylene, chlorinated or brominated butyl rubber.

The formulation of these elastomer compounds can obviously be adapted by adding reinforcing additives, anti-oxidation agents and vulcanizing agents depending on the rigidity requirements for the different segments of the self-supporting membrane 3. It is advantageous to select, among the reinforcing additives, those which are compatible with the requirements of use and further increase the resistance to fire, without adversely affecting the flexibility and mechanical strength of the membrane. Preferably, litharge base additives or metal oxides, combined with carbon black, will produce the properties and characteristics required by and suitable for the present invention.

With respect to the textile reinforcement embedded in the elastomer compound, all the materials conventionally used in the rubber transformation industry can be employed, and in particular rayon, polyamide, polyester or aramid fibers.

The self-supporting membrane is generally made from cord-plies reinforced elastomer compounds. For example, the large sections of the membrane consisting of straight segments would be advantageously reinforced with these textiles for added support. In contrast, the mitre connections of the top corners A, A' and/or the bottom corners B, B' would not be reinforced so as to provide more flexibility. Advantageously, the horizontal section forming a 'roof' is made of an elastomer compound which does not contain textile reinforcement, so that it remains more deformable.

The membrane has a thickness (e) which is essentially constant for the top peaks of the intermediate corrugations as well as the substantially flat connections which surround them, and have a variable width. In contrast, the bottom peaks of the corrugations, which are flush with the exterior surface (F), have a thickness equal to approximately twice the thickness of (e), by addition of a rubber-based profile which may have a modulus higher than the rest of the coating. This design provides for a small flat surface, having a width of approximately (e), on the exterior surface (F), surrounded by two curved portions, each of which has a radius of curvature almost equal to (e).

Thus the textile reinforcement of the self-supporting membrane, some distance away from the exterior surface (F), is protected against abrasion and pitting from exterior forces such as wash water, dust and dirt. To re-establish homogeneity of the extreme deformations, the thickness must be changed by the addition of the quantity of material necessary in the form of additional layers or folds of elastomer material in the areas located on one hand between the fastening bead 20 and the deepest corrugation 9, and on the other hand between assembly bead 21 and the shallowest corrugation 19. Whereas, in the intermediate corrugations between the shallowest corrugation 19 and the deepest corrugation 9, the thickness remains essentially constant and equal to (e).

In an embodiment of the present invention, the value of the essentially constant thickness (e) is 8 millimeters, whereas the thickness of the membrane increases to 11 millimeters from the deepest or shallowest corrugation to the corresponding fastening beads (20) or (21).

According to the invention the depth of the corrugations and the distance between each of the corrugation folds changes. The depth may change linearly, increasing from the shallowest (b) up to the deepest (a). In an embodiment, several corrugations may have a depth substantially equal to the shallowest, so that they stay behind the assembly flange 5 when completely compressed. The depth of the following corrugations may increase continuously or discontinuously up to the deepest (a). Likewise, the distance between each corrugation (f) may be constant or may vary from one end of the membrane to the other.

In the embodiment as shown in FIGS. 3 and 4, the overall height (a) is 145 millimeters, the overall height (b) is 95 millimeters, and the distance (f) between the corrugations is relatively constant.

FIG. 5a shows the deformation of deformable membrane 3 allowable when the membrane is fully extended and FIG. 5b shows the deformation of deformable membrane 3 allowable when the membrane is fully compressed.

FIG. 5a is the almost fully extended position assumed by the self-supporting membrane when outside of a curve of the trajectory between the end surfaces of the railway vehicles. This position causes a slight relative rotation of the surface (P) on the fastening flange 4 and of the surface (Q) on the assembly flange 5.

It is apparent that the extra thickness 23, which may have Young's modulus, that is, the modulus of elasticity in tension, greater than that of the wall as a whole, stiffens the exterior peak of each corrugation and prevents the non expandable parts from kinking. The straight segments are connected by multiple mitres and meet at points to form a polygonal shape on the periphery of the railway car. The mitre connection points further act to stiffen the assembly. Correspondingly, the bottoms of corrugations are stretched out essentially as an extension of the flat wall segments which connect them. The areas near the beads 20 and 21 are less deformed due to the rigidity of the additional thickness imposed on the bottom peaks of the shallowest corrugation 19 or of the deepest corrugation 9.

FIG. 5b shows the maximum possible compression of the self-supporting membrane between the two railway vehicles, inside a curve of the trajectory which brings nearer the end surfaces of the vehicles, and causes the same relative rotation of the surfaces (P) and (Q) used for fastening the fastening flanges 4 and assembly flanges 5. The anchor plates 15 and 16 and their bolts touch the wall of the deepest corrugation 9 and of the shallowest corrugation 19, respectively. The first corrugation as well as subsequent corrugations must not touch the assembly flange 5. As shown in FIG. 5b, according to the design, the corrugation nearest assembly flange 5 is the shallowest and does not touch assembly flange 5. Likewise, although the subsequent corrugations increase in depth, the top peaks of these corrugations advantageously do not touch assembly flange 5.

Another advantage of the design of increasing the depth of each corrugation as they are compressed lies in the fact that there is no compression of the internal curvature of each corrugation. Simply stated, one fold or corrugated pleat will not be squeezed and engulfed between two intermediate folds or pleats.

A yet further advantage of the design is that the end surfaces 23 of the bottom pleats, which have the added layers of elastomer compound for extra thickness, are almost always in continuous contact with the exterior surface (F).

FIG. 6a illustrates a enlarged portion of the end of one side of the self-supporting membrane previously shown in its entirety in FIG. 2. The detailed end parts of the membrane shown are as follows:

the horizontal roof segment 12, connecting mitre (R'), top corner (A'), which has a short straight segment 24, connecting mitre (T'), upper diagonal, straight segment 22, connecting mitre (S') and straight segment 10' which is substantially vertical.

The end portions of the straight segments 12, 22 and 10 are produced by molding and reinforced in the pleats with textile materials. The end portions are peeled, that is, a portion of the coating is removed, and then the end portions are connected in the molds with as-yet-unvulcanized elastomer layers, as required. Thus, the non-developable shapes can be reconstituted, on one hand of the smaller mitre S' and on the other hand, of the top corners A' constituted by two mitre connections R', T' on the order of 35 to 40 degrees separated by a short straight segment 24.

Since the molds producing the straight segments can be adjusted to produce segments of varying lengths, both segments located at top corners A, A' and segment 14a, 14a' located at bottom corners B, B' can be produced in the same mold.

Likewise, the smaller mitres S, S' are constructed between the bottom diagonal segments 14 and the bottom horizontal segment 13. In an embodiment (not illustrated) which has a slightly different geometry, the bottom corners B, B' are constructed by a single mitre connection.

These different constructions in the corner areas allow for more deformation of the corners, without using a textile reinforcement in end sections of the membrane. The end portions are, however, stiffened against any risk of kinking with the extra thicknesses 23 provided for in the design.

FIG. 6b shows, in an orthogonal sectional view of any one of the straight segments, the construction of the corrugation peaks having the extra thickness 23. These peaks having additional thickness have a modulus of elasticity which may be higher than the modulus of the wall section of the corrugation as a whole. The wall sections are extended to each mitre section inside the connection molds.

The method for producing a deformable, self-supporting membrane according to the invention includes, prior to the connections, the fabrication of vertical, straight segments 10, horizontal, straight segments 12 and 13 and different diagonal segments 14 and 22. The fabrication is conducted by molding on a vulcanization press of a blank profile consisting of a superimposition of pleats of elastomer compound which may or may not be reinforced with textile fibers.

The thickness of the corrugations is modified along the entire length of the deepest corrugation 9 and the shallowest corrugation 19 near the beads 20 and 21, respectively, by adding textile fibers as reinforcement to strengthen the beads. The extra thickness 23 which stiffens the end peaks of each corrugation is obtained during fabrication. After reviving the surface of the membrane, a profile made of an elastomeric compound reinforced with additives such as reinforcing fillers and possibly short fibers, is added to the basic corrugation. The elastomer profile can have a higher modulus than that of the regular coating.

According to the invention, a preferential orientation, caused by the extrusion of the elastomer profile, creates an anisotropic condition increasing the level of the longitudinal modulus of the elastomer profile due to the addition of short fibers to the elastomer compound. It is within the scope of the invention that a fabric can also be used for the same purpose during the production of the elastomer profile.

To ensure the connection or bonding, the "peeled" portion of the textile fibers is covered by the necessary layers or coatings of elastomer substance which has not yet been vulcanized while the elastomer profile is enclosed in the molds. The sequence of these connection or bonding operations allows for the correction of any defects or flaws in the overall perimeter when the membrane is formed into a one-piece, ring-like, tunnel shaped membrane which is self-supporting and deformable. The membrane can then be transported as a single unit and is even sufficiently flexible that it can be twisted into a figure eight for shipment purposes.

The advantages of the deformable membrane, in addition to being one-piece and having an essentially self-supporting structure, according to the invention reside in the fact that the membrane:

provides a superior, encompassing seal against noise and wind;

provides effective soundproofing and resistance to pressure differential caused by trains passing at high speed due to its thickness and its mass;

has a suitable stiffness which permits a homogeneous deformability of each corrugation as the consecutive railway vehicles in service move closer together and farther apart;

does not reduce the size of the passage way between the consecutive railway cars, thus allowing for unrestricted intercommunication and movement through the internal passage way;

is easy to install using the bolted or riveted straight anchor plates of the self-supporting membrane to connect to a fastening flange and an assembly flange; and is economical to install since the flanges may be prepared or pre-formed in the factory, prior to installation on the vehicles.

In summary, one feature of the invention resides broadly in an elastically deformable, one-piece, self-supporting membrane 3 providing weatherproof protection for an intercommunication passage way between successive railway or road vehicles 1 and 2, consisting of an elastomer compound locally reinforced with textile cords or fibers, formed by successive corrugations, which constitute its straight sections, having a continuous corrugated right-angle cross section over the entire periphery of the passage to be protected, characterized by the fact that: the depth of the successive corrugations increases from one end to the other, one end being equipped with an assembly flange 5 to connect with railway car 1, the other end being capable of connecting with a fastening flange 4 on a surface P which is part of the vehicle 2.

Another feature resides in that the essentially constant thickness e of the membrane wall along the intermediate corrugations may be increased along the length of the shallowest corrugation 19 on one end and may similarly be increased along the deepest corrugation 9 at the other end.

Yet another feature resides in that the peak of each corrugation is flush with the exterior surface F of the self-supporting membrane 3. Additionally, each peak has a thickness which is significantly greater than the essentially constant thickness e of the intermediate corrugations since an elastomer compound profile is used to add an extra thickness 23. Still further the straight segments of the self-supporting membrane 3 are interconnected with mitres and are also connected at the top corners A and possibly at the bottom corners B by mitre connections separated by a short straight segment 24.

Another feature of the invention resides broadly in an elastically deformable, self-supporting membrane 3 which is characterized by the fact that the overall height b of the shallowest corrugation 19 is 0.65 times the overall height a of the deepest corrugation 9.

Yet another feature of the invention resides broadly in an elastically deformable, self-supporting membrane 3 which is characterized by the fact that the increase of the depth of the successive corrugations follows a linear law, as a function of their position.

A further feature of the invention resides broadly in an elastically deformable, self-supporting membrane which is characterized by the fact that the increase of the depth of the successive corrugations follows a continuous or discontinuous, non-linear law, preventing the first corrugation and several successive corrugations from coming into contact with the assembly flange 5.

A yet further feature of the invention resides broadly in an elastically deformable, self-supporting membrane 3 which is characterized by the fact that the essentially constant thickness e of the intermediate corrugations is eight millimeters for a section of membrane over five meters high and four meters wide being designed for use on one-story or two-story auto-trains.

Yet another further feature of the invention resides broadly in an elastically deformable, self-supporting membrane 3 which is characterized by the fact that the coating of the walls consists of an elastomer compound based on an elastomer having atoms of chlorine or bromine in its molecule, and combined with reinforcing fillers giving it a good resistance to fire.

An additional feature of the invention resides broadly in an elastically deformable, self-supporting membrane 3 which is characterized by the fact that the extra thickness 23 stiffening the exterior peak of each corrugation has a thickness which is slightly different from the essentially constant thickness e and has a Young's modulus which is higher than that of the elastomer compound of the wall coating.

A yet additional feature of the invention resides broadly in an elastically deformable, self-supporting membrane 3 which is characterized by the fact that the extra thickness 23 imparted by the anisotropic elastomer compound profile reinforced with short fibers has a preferential orientation in the longitudinal direction of the profile having the extra thickness 23.

A further additional feature of the invention resides broadly in an elastically deformable, self-supporting membrane 3 which is characterized by the fact that the connections of horizontal straight segments 12 and vertical straight segments 10 to the top corners A and possibly to the bottom corners B have angles of deviation from 35 to 40 degrees.

A yet further additional feature of the invention resides broadly in an elastically deformable, self-supporting membrane 3 which is characterized by the fact that the bead portion of the shallowest corrugation 19 is fastened to the assembly flange 5 while the bead portion of the deepest corrugation 9 is fastened to the fastening flange 4.

Another further additional feature of the invention resides broadly in an elastically deformable, self-supporting membrane 3 which is characterized by the fact that it encloses the various mechanical assembly components such as the anchor plates 15 and 16, thus protecting them from environmental conditions.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to by incorporable, at applicant's option, into the claims during prosecution as further limitations in the claims to patentably distinguish any amended claims from any applied prior art.

The invention as described hereinabove in the context of the the preferred embodiments is not to be taken as limited to all of the provided details thereof, since modifications and variations thereof may be made without departing from the spirit and scope of the invention.

What is claimed is:

1. A system for connection of consecutive vehicles, providing for intercommunication between the consecutive vehicles, said system comprising:
   an elastically deformable membrane being substantially in one-piece, and self-supporting for providing substantially weatherproof protection of a passage way between consecutive vehicles;
   said membrane formed by a plurality of successive corrugations;
   said membrane having one end means for being connected to one end surface of a first vehicle;
   said membrane having an opposite end means opposite said one end means for being fastened to and unfastened from an end surface of a second vehicle consecutive to the first vehicle;
   said corrugations of said membrane being flexible for extension and compression within a range of distances between the consecutive vehicles;
   said corrugations of said membrane comprising successive peaks;
   said corrugations of said membrane having a plurality of depths of corrugations between said successive peaks; and
   the depth of said corrugations increasing from one of: said one end of said membrane and said opposite end of said membrane toward the other of said one end of said membrane and said opposite end of said membrane.

2. Elastically deformable, self-supporting membrane according to claim 1, wherein the overall height of the shallowest corrugation is 0.65 times the overall height of the deepest corrugation.

3. Elastically deformable, self-supporting membrane according to claim 2, wherein the increase of the depth of the successive corrugations follows a linear mathematical progression, as a function of the successive position of the successive corrugations.

4. Elastically deformable, self-supporting membrane according to claim 2, including an assembly flange fastened to said membrane and wherein the increase of the depth of the successive corrugations follows a non-linear mathematical progression, said progression being one of: continuous and discontinuous;
   a first corrugation and several successive corrugations being configured to substantially prevent contact between said corrugations and said assembly flange fastened to said membrane.

5. Elastically deformable, self-supporting membrane according to claim 3, wherein said plurality of corrugations comprises: an intermediate portion; said intermediate portion having an essentially constant thickness being eight millimeters;
   wherein a section of said membrane is over five meters in height and four meters in width; and
   said membrane being configured for use on at least one of: one-story auto-trains and two-story auto-trains.

6. Elastically deformable, self-supporting membrane according to claim 5, wherein: said plurality of corrugations further comprises an elastomer compound including an elastomer having atoms in at least one molecule of at least one of: chlorine and bromine, and;
   said elastomer compound comprising fire resistant reinforcing fillers.

7. Elastically deformable, self-supporting membrane according to claim 6, wherein said elastomer compound is locally reinforced with textile cords.

8. Elastically deformable, self-supporting membrane according to claim 7, wherein said plurality of corrugations comprises outer portions having a thickness being substantially greater than said substantially constant thickness of said intermediate portions of said plurality of corrugations; and
   said greater thickness is the result of adding an extra thickness comprised of a profile of elastomer compound applied to the surface of the outer portion.

9. Elastically deformable, self-supporting membrane according to claim 8, wherein said corrugation means comprise straight segments;
   said straight segments of said self-supporting membrane being connected to each other with mitre connections; and
wherein the end portions enclose a plurality of mechanical assembly components including at least one of anchor plates and connections.

10. Elastically deformable, self-supporting membrane according to claim 1, wherein: said membrane comprises an elastomer compound including an elastomer having atoms in at least one molecule of at least one of: chlorine and bromine; and
   said elastomer compound comprising fire resistant reinforcing fillers.

11. Elastically deformable, self-supporting membrane according to claim 1, wherein corrugations comprise horizontal and vertical straight segments, top corners, and bottom corners, and connections therebetween; said horizontal straight segments and vertical straight segments being connected to at least one of said top corners and said bottom corners; said connections have angles of deviation from about 35 to 40 degrees.

12. Elastically deformable, self-supporting membrane according to claim 1, wherein said one end means of said membrane has a corrugation with the shallowest depth in comparison with the depth of the other of said corrugations, an assembly flange is fastened to said membrane one end means; and
   said opposite end means of said membrane having a corrugation with the deepest depth in comparison with the depth of the other of said corrugations; and a fastening flange is attached to said membrane opposite end means.

13. A system for connection of consecutive vehicles, providing for intercommunication between the consecutive vehicles, said system comprising:

an elastically deformable membrane being substantially in one-piece, and self-supporting for providing substantially weatherproof protection of a passage way between successive vehicles;

said membrane formed by a plurality of successive corrugations;

said corrugations comprising substantially straight segments;

said corrugations comprising elastomer means;

said membrane having one end means for being connected to one end surface of a first vehicle;

said membrane having an opposite end means opposite said one end means for being fastened to and unfastened from an end surface of a second vehicle consecutive to the first vehicle;

said corrugations of said membrane being flexible for extension and compression within a range of distances between the consecutive vehicles;

said corrugations of said membrane comprising successive peaks with intermediate portions disposed between said peaks;

said peaks comprising an outer portion of peaks for being disposed away from the passage way and an inner portion of peaks for being disposed towards the passage way;

said outer portion of peaks for being substantially aligned with an exterior surface of the successive vehicles;

said corrugations having a depth between the successive peaks;

said corrugations having a substantially constant thickness in the intermediate portions thereof disposed between successive peaks;

said outer peaks having a thickness being substantially greater than the substantially constant thickness of the intermediate portions of the corrugations;

said greater thickness being the result of the addition of an extra-thickness comprised of a profile of elastomer compound applied to the elastomer having a substantially constant thickness; and said peaks have a longitudinal direction and wherein the extra thickness comprises an anisotropic elastomer compound reinforced with short fibers, at least a substantial portion of said short fiber being orientated in a longitudinal direction of the profile of elastomer compound.

14. Elastically deformable, self-supporting membrane according to claim 13, wherein said corrugation means have a plurality of depths of corrugations between successive peaks of said corrugations; and the depth of said corrugations increases from one of: said one end of said membrane and said opposite end of said membrane toward the other of said one end of said membrane and said opposite end of said membrane.

15. Elastically deformable, self-supporting membrane according to claim 14, wherein the increase of the depth of the successive corrugations follows a linear mathematical progression, as a function of the successive position of the successive corrugations.

16. A system for connection of consecutive vehicles, providing for intercommunication between the consecutive vehicles, said system comprising:

an elastically deformable membrane being substantially in one-piece, and self-supporting for providing substantially weatherproof protection of a passage way between consecutive vehicles;

said membrane formed by a plurality of successive corrugations;

said corrugations having a continuous corrugated cross section over the entire periphery of said membrane for covering the passage way to be protected;

said membrane having one end means for being permanently connected to an end surface of a first vehicle;

said one end means including a fastening flange for fastening said membrane to said end surface of said first vehicle;

said membrane having an opposite end means opposite said one end means for being fastened to and unfastened from an end surface of a second vehicle consecutive to the first vehicle;

said end surface of the second vehicle being equipped with a fastening flange;

said corrugations of said membrane being flexible for extension and compression within a range of distances between consecutive vehicles;

said corrugations of said membrane comprising a plurality of successive peaks;

said plurality of successive peaks comprising outwardly disposed peaks disposed away from the passage way and inwardly disposed peaks disposed towards the passage way;

said outwardly disposed peaks being substantially aligned with the exterior surface of the consecutive vehicles; and said corrugations having a depth between said plurality of successive peaks;

said corrugations further comprising horizontal and vertical straight segments; and said horizontal and vertical straight segments being connected to each other with mitre connections.

17. Elastically deformable, self-supporting membrane according to claim 16, wherein said one end means and said opposite end means further include a plurality of mechanical assembly components including at least one of: anchor plates and connections.

18. Elastically deformable, self-supporting membrane according to claim 16, wherein said corrugations means have a plurality of depths of corrugations between successive peaks of said corrugations; and the depth of said corrugations increase from one of: said one end of said membrane and said opposite end of said membrane toward the other of said one end of said membrane and said opposite end of said membrane.

* * * * *